United States Patent Office 3,140,278
Patented July 7, 1964

3,140,278
BLOCK HOMOPOLYMERS OF 1,3 DIENES
Irving Kuntz, Roselle Park, N.J., assignor to Esso Research and Engineering Company, a corporation of Delaware
No Drawing. Filed Mar. 25, 1960, Ser. No. 17,468
9 Claims. (Cl. 260—94.2)

This invention relates to a novel process of preparing block homopolymers and the products obtained thereby.

The polymerization of 1,3 dienes to rubbery homopolymers using lithium hydrocarbon catalysts is known, e.g. see Australian patent applications 22,559 and 22,560 of October 1956. The preparation of block copolymers of these dienes and other olefins is also known. (See U.S. application Serial No. 816,710, by I. Kuntz and A. Gerber.)

It has now been found that it is possible to prepare block copolymers derived from a single 1,3 diene. The first block of a block homopolymer is prepared by polymerizing the 1,3 diene monomer with either one of the following catalyst systems, (1) a lithium hydrocarbon in a hydrocarbon solvent or (2) a lithium hydrocarbon in a solvent consisting of hydrocarbons plus an organic compound selected from the group consisting of ethers or tertiary amines. If catalyst system (1) has been used in the first step, the second block polymerization process is performed by permitting polymerization to continue with the fresh monomer added at this point accompanied by the addition of ether or tertiary amine in the absence of any additional lithium hydrocarbon. If catalyst system (2) has been used in the first block step, the initially present ether or tertiary amine is first removed from the reaction mixture, and then additional monomer is added now in the absence of any additional lithium hydrocarbon. The lithium hydrocarbon initiator, it should be emphasized, is only added in the first step of the polymerization. Thereafter the block polymerization is carried out only by monomer addition. Polymer structure is controlled by the periodic presence and absence of ether and/or amine. Thus considering the hydrocarbon solvent alone as one solvent system and the solvent with organic compound as another, the alternation of the solvent system controls the structure. If desired, the block copolymer consisting of two blocks at this stage such as A—A—A—A—B—B—B—B, where A—B differ only structurally, may now be isolated by the usual procedure, or alternately, the further block copolymerization may be continued in the fashion indicated to produce multi-block copolymers. It will be obvious that the length of the blocks can be controlled by the amount of monomer used in the particular step of the block copolymerization, while the structure of the block is determined only by the above-described specific conditions of polymerization.

The block homopolymers are brought about by directed, sequential controlled polymerization, e.g. blocks of 1,4 and 1,2 and 3,4 addition of the 1,3-diene comprise the different blocks of the block copolymer. For example, butadiene when polymerized in aliphatic solvents with lithium hydrocarbon gives a polymer with 90% 1,4-structure (about equal amounts of cis and trans) and 10% 1,2-addition. When butadiene is polymerized in the presence of ethers 1,2-addition becomes the main structural feature. It is thus possible to synthesize a new type of structural block copolymer, which are at the same time compositional homopolymers. This structure, for a two block butadiene polymer is indicated by the formula:

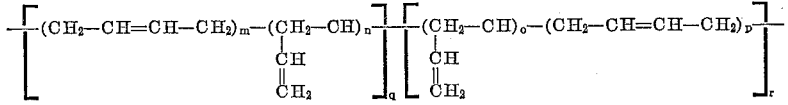

where the value of the subscripts, which indicate the relative proportions of the different structural features can be controlled by the particular experimental conditions.

By a similar process, one can obtain block homopolymers derived from isoprene. Here, the different modes of isoprene addition are primarily cis-1,4 and 3,4.

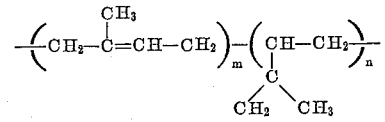

The examples shown later will make these points clear.

Structural block copolymer systems of different single monomers can be combined to yield structural-compositional block copolymers using single monomers and the special conditions described in turn.

The 1,3 dienes that can be used in the process of this invention include butadiene, isoprene, 2,3-dimethylbutadiene, piperylene, 2-alkyl-1,3-butadienes, 2,3-dialkyl-1,3-butadienes, etc.

The lithium hydrocarbon catalysts used are those known in the art. Typical examples thus include n-butyl lithium and other alkyl, alkaryl or cycloalkyl lithiums such as propyl lithium, isobutyl lithium, tertiary butyl lithium, amyl lithium, cyclohexyl lithium, phenyl ethyl lithium, etc. This material is utilized in an amount from .001 to 1 mol percent based on the dienes.

The organic ethers that are employed in the second catalyst system can be alkyl, aryl, aralkyl, alkaryl, and cyclic ethers such as dioxane and tetrahydrofuran. Ethers of glycols may also be employed, for example, the dimethyl ether of diethylene glycol, etc. The ether when it is employed comprises 1 to 80% of the solvent for the reactions.

The tertiary amines that can be used include trimethyl amine, triethyl amine, trialkyl amines, generally, and cyclic tertiary amines such as pyridine and quinuclidine. These are employed in the same amount as the ethers and can be used with them.

Aliphatic solvents are preferred for the process of this invention, e.g. heptane, pentane, butane, hexane. Aromatic solvents, such as benzene and toluene can also be employed. Acidic hydrocarbons such as cyclopentadiene should be avoided. Temperatures in the range of —10 to 100° C. are used. Pressures of atmospheric to 10 or 20 atmospheres are employed so as to maintain a high concentration of the reactants in the liquid phase.

It is apparent that the reaction can be initiated with one catalyst system and then continued with added monomer and the other catalyst system so as to achieve great flexibility in formation of the polymer, e.g. 1,4 structure followed by 1,2 addition or vice versa. The sequence of operations can be repeated many times providing that a change is made from one catalyst system to the other. The ether or amine can thus be removed for the subsequent operation by vacuum stripping, by the application of reduced pressure and heat if necessary.

The polymerization is carried out in an inert atmosphere, in the absence of air, carbon dioxide, oxygen, etc. It may be carried out under an atmosphere of an inert gas such as pure nitrogen, helium, argon, etc., in vacuum, or under a pressure of inert organic materials.

When a polymer of the desired structure has been prepared, the polymerization may be terminated by the addition of a trace of water or alcohol and the product isolated by standard techniques. Such techniques would be by precipitation into a non-solvent, by flashing off solvent by a slurrying technique with a hot non-solvent, etc. The polymer is then stabilized, dried and packaged in the usual way.

The products obtained can vary from liquids to high molecular weight plastic or elastomers, depending on molecular weight and copolymer composition. The polymer structure regulation obtained by this invention affords control of cure rate and physical properties such as brittleness, transition temperature, etc.

This invention and its advantages will be better understood by reference to the following examples.

Example 1

A solution was prepared from 58 g. of butadiene in 200 cc. of n-heptane in a glass bottle. This solution was then treated with 2 cc. of a 0.8 molar solution of n-butyllithium in n-heptane. The reaction mixture, prepared in the dry-box under pure nitrogen was then sealed, put aside, and polymerization was now allowed to proceed at room temperature, for an arbitrary period of 2 weeks. At the end of this period, other experiments had indicated, more than enough time had been allowed for polymerization to be complete and reactive polybutadiene molecules had been formed and no butyllithium remained.

Separately, a solution was then prepared from 58 g. of butadiene, 5 cc. of tetrahydrofuran and 200 cc. of n-heptane. This solution was added to the original reaction mixture in the dry box and the bottle closed. Polymerization occurred as evidenced by the production of heat. Twenty-four hours later the solution was very viscous. Stabilizer was added and the polymer isolated by precipitation with isopropyl alcohol. After drying in the vacuum, over 115 g. of polymer were obtained corresponding to the theoretical yield. The inherent viscosity of the material in toluene was 2.25.

The infrared spectrum of the material was examined in carbon disulfide solution, and showed a gross structure of 31% trans 1,4, 28% cis 1,2 and 41% 1,2 addition. On the basis of other experiments the structure of the first block was 46% trans 1,4, 45% cis 1,4 and 9% 1,2 while the stereochemistry of the second block was 16% trans 1,4, 11% cis 1,4 and 73% 1,2 addition.

The polymer formula can be represented as follows:

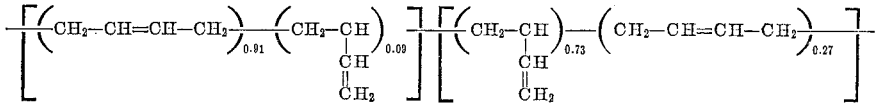

The block polymer product was different from the homopolymer derived from either of its blocks alone. It combined a rubbery character with an extensibility greater than that of homopolymers with structures of the blocks from which it was composed.

Example 2

A solution prepared from 68 g. of isoprene and 300 cc. of n-heptane was added to a 2 liter stainless steel autoclave under a nitrogen atmosphere. The autoclave was then pressured with prepurified nitrogen to 20 p.s.i.g., and heating begun. When the temperature of the reaction mixture was 37° C., a charge of 3 cc. of 0.8 m. n-butyllithium and 10 cc. of n-heptane were added from a small pressure bomb. Reaction temperature was maintained between 45–50° C. by intermittent application of chilled water through a cooling coil installed in the reactor. Reaction was allowed to proceed at this temperature for 1.13 hours, a length of time other experiments had indicated was sufficient for complete reaction.

The reaction mixture which at this stage contained the first block of the planned copolymer was then cooled to 12° C. and a solution of 61 g. of isoprene, 100 cc. of Korotkov: Angewandte Chemie, vol. 70, p. 85 (1958). n-heptane and 25 cc. of tetrahydrofuran were then added. It will be noted that this second charge contained additional monomer and an ether (tetrahydrofuran) but no additional lithium hydrocarbon catalyst. The temperature of the reaction mixture rose to 30° C. over the next 0.25 hour and was then cooled to 19° C. After standing, the polymer was isolated and after drying 120 g. of polymer were isolated, in excellent agreement with the theoretical yield (129 g.) considering manipulative losses. The inherent viscosity of the block copolymer as determined in toluene solution at 23° C. was 0.95.

From the examination of a carbon disulfide solution of the block copolymer by infrared spectroscopy, the structure of the polymer was:

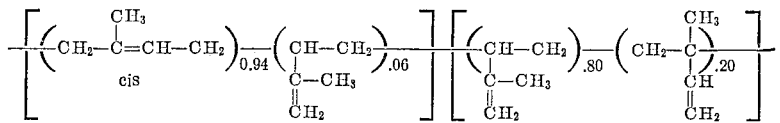

It will be noted that the first block, prepared under the first experimental conditions, indicated inside the first large bracket, is almost exclusively of cis-1,4 stereochemistry, the second block prepared in the absence of additional alkyl lithium catalyst but with ether present consists mainly of so-called 3,4-addition of the isoprene units.

It was noted that the block copolymer of the present invention was different than either a poly-cis-1,4 isoprene, or a poly-3,4-isoprene. The material was rubbery in character yet on drawing the gum, extreme extensibility which gave long fibers was observed.

The advantages of this invention will be apparent to the skilled in the art. Novel products and a flexible process for making them are made available resulting in a system of polymer architecture.

It is to be understood that this invention is not limited to the specific examples which have been offered merely as illustrations and that modifications may be made without departing from the spirit thereof.

What is claimed is:

1. A process for preparing a block homopolymer of a 1,3 diene which comprises sequentially polymerizing the diene substantially to completeness at each step with a catalyst selected from the group consisting of (1) a lithium hydrocarbon in a hydrocarbon solvent system and (2) a lithium hydrocarbon in a solvent system of a hydrocarbon solvent plus an organic compound selected from the group consisting of ethers and tertiary amines; and polymerizing the resultant polymer with additional monomer with the solvent system other than that employed in the preceding step and in the absence of additional lithium hydrocarbon.

2. The process of claim 1 in which the diene is 1,3-butadiene.

3. The process of claim 2 in which the lithium hydrocarbon is n-butyl lithium.

4. The process of claim 3 in which the organic compound is tetrahydrofuran.

5. A process in which the steps described in claim 1 are repeated to prepare multiblock homopolymers.

6. The process of claim 1 in which the monomer is isoprene.

7. A block homopolymer of a 1-3 diene as prepared by the process of claim 1.

8. A block homopolymer of isoprene as prepared by the process of claim 1.

9. A block homopolymer of butadiene as prepared by the process of claim 1.

References Cited in the file of this patent

Ziegler: "Rubber Chem. and Tech.," vol 11, 1938, pp. 501–507.

Hsieh: Jour. Pol. Sci., vol. 25, pp. 245–47 (1957).

Hsieh: Jour. Pol. Sci., vol. 26 pp. 240–42 (1957).

Morita: Jour. Am. Chem. Soc., vol. 79, pp. 5853–55 (1957).

Korotkov: Angewandte chemie, vol. 70, p. 85 (1958).

UNITED STATES PATENT OFFICE
CERTIFICATE OF CORRECTION

Patent No. 3,140,278                                          July 7, 1964

Irving Kuntz

It is hereby certified that error appears in the above numbered patent requiring correction and that the said Letters Patent should read as corrected below.

Column 2, lines 8 to 12, the formula should appear as shown below instead of as in the patent:

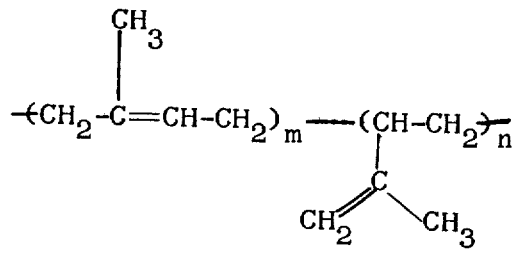

column 4, line 6, strike out "Korotkov: Angewandte Chemie, vol. 70, p. 85 (1958).".

Signed and sealed this 22nd day of December 1964.

(SEAL)
Attest:

ERNEST W. SWIDER
Attesting Officer

EDWARD J. BRENNER
                                                       Commissioner of Patents